(12) United States Patent
Tam et al.

(10) Patent No.: US 11,409,336 B2
(45) Date of Patent: Aug. 9, 2022

(54) CAMERA LENSES AT COMPUTER DEVICES

(71) Applicant: HEWLETT-PACKARD DEVELOPMENT COMPANY, L.P., Spring, TX (US)

(72) Inventors: Alan Man Pan Tam, Spring, TX (US); Chung Hua Ku, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 247 days.

(21) Appl. No.: 16/636,567

(22) PCT Filed: Oct. 4, 2017

(86) PCT No.: PCT/US2017/055152
§ 371 (c)(1),
(2) Date: Feb. 4, 2020

(87) PCT Pub. No.: WO2019/070253
PCT Pub. Date: Apr. 11, 2019

(65) Prior Publication Data
US 2021/0157370 A1    May 27, 2021

(51) Int. Cl.
*G06F 1/16* (2006.01)
(52) U.S. Cl.
CPC .......... *G06F 1/1686* (2013.01); *G06F 1/1618* (2013.01)
(58) Field of Classification Search
CPC .. H04N 5/23238; H04N 5/2257; H04N 7/142; G06F 1/1686; G06F 1/1681; G06F 1/1618; G06F 1/1616; G02B 13/06; G03B 37/00; G06T 3/0062; H04M 1/0264
See application file for complete search history.

(56) References Cited

U.S. PATENT DOCUMENTS

| | | | |
|---|---|---|---|
| 6,496,361 B2 | 12/2002 | Kim | |
| 7,089,628 B2 | 8/2006 | Lin | |
| 7,298,392 B2 | 11/2007 | Cutler | |
| 7,486,324 B2 | 2/2009 | Driscoll et al. | |
| 8,115,798 B2 | 2/2012 | Kim et al. | |
| 8,203,833 B2 | 6/2012 | Huang | |
| 9,323,346 B2 | 4/2016 | Lv et al. | |
| 9,465,415 B2* | 10/2016 | Skogoe | G06F 3/013 |
| 10,013,031 B2* | 7/2018 | Knepper | G06F 1/1618 |
| 10,101,777 B1* | 10/2018 | Tucker | G06F 1/1686 |
| 10,222,824 B2* | 3/2019 | Quiet | A63F 13/24 |
| 2006/0197863 A1 | 9/2006 | Kim | |
| 2007/0182663 A1* | 8/2007 | Biech | G06F 1/1618 |
| | | | 345/1.1 |
| 2017/0195565 A1* | 7/2017 | Ollier | G02B 13/005 |

OTHER PUBLICATIONS

Feng, X-F, et al, "Research on the a.ppice-itton of Single Camera Stereo Vision Sensor in Three-dimensional point Measurement", Mar. 27, 2015.

* cited by examiner

*Primary Examiner* — James Wu
(74) *Attorney, Agent, or Firm* — Perrier + Currier Inc.

(57) ABSTRACT

A device includes a housing and a camera device at the housing. The camera device includes an image sensor and a fisheye lens. The fisheye lens is positioned at the housing to point upwards to capture an image of a scene around the housing. A processor is disposed in the housing and is coupled to the camera device. The processor is to execute instructions. The instructions are to convert the image of the scene into a panoramic image.

12 Claims, 12 Drawing Sheets

CAMERA LENSES AT COMPUTER DEVICES

BACKGROUND

Cameras are often used in computers and similar electronic devices to capture images and communicate with people at remote locations.

DETAILED DESCRIPTION

A user often has to take care to position themselves within a field of view for image capture by a camera installed at, for example, the user's notebook computer. It may be very difficult to accommodate multiple users who wish to be in the scene. Stitching images captured by multiple cameras may be overly computationally expensive. Further, physically accommodating multiple cameras or one camera with a wide field of view poses a challenge, particularly, in portable computer devices, such as notebook computers, tablets, and the like.

A computer device may include a camera having a 360-degree lens, such as a fisheye lens. The lens may be installed at the hinge of the computer device, so that the computer device may then be opened into a configuration in which the lens points upwards to capture a scene around the computer. Such a scene may include people situated around a conference room table. Captured images or video may be processed into a panoramic view, so that people remote from the computer device may view the people situated around the table. The camera may be accommodated in the hinge using various recesses and mechanisms to allow the computer device to close in the expected manner.

Figure 1:
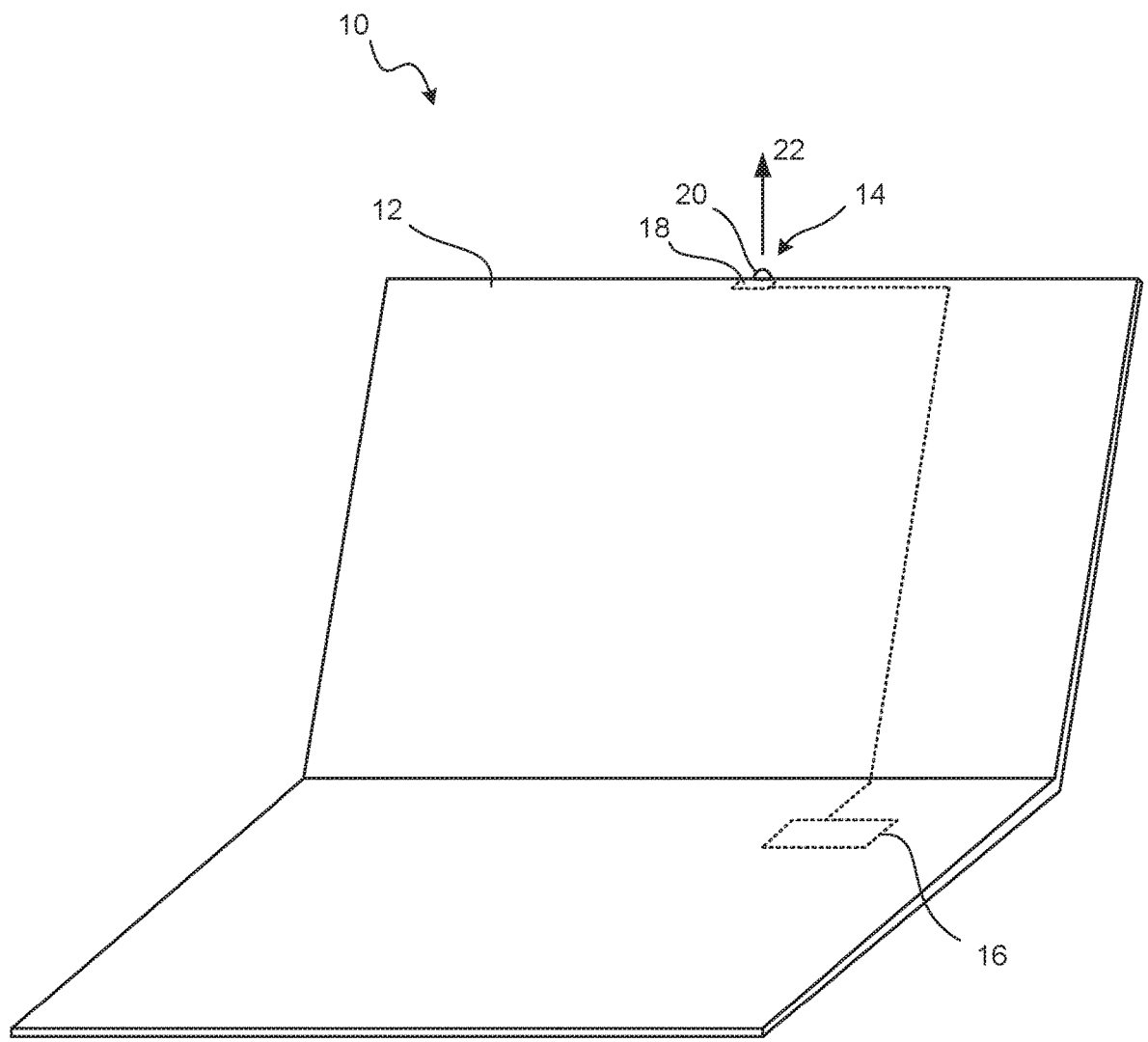
FIG. 1 is a perspective view of an example computer device.

FIG. 1 shows an example computer device 10, such as a laptop or notebook computer. The computer device 10 includes a housing 12, a camera device 14, and a processor 16. The camera device 14 is located at the housing 12 and may be physically connected to the housing 12. The processor 16 may be contained in the housing 12. The housing 12 may include several portions and the camera device 14 and processor 16 may be located in different portions.

The camera device 14 includes an image sensor 18 and a fisheye lens 20, a 360-degree lens, or similar. The fisheye lens 20 may be a hemispherical fisheye lens. The fisheye lens 20 is positioned at the housing 12 to point upwards 22 to capture an image of a scene around the housing 12. When pointed in this way, a outer region of the fisheye lens 20 may capture a 360-degree field of view around the housing 12.

The processor 16 is coupled to the camera device 14. The processor 16 may include a central processing unit (CPU), a microcontroller, a microprocessor, a processing core, a field-programmable gate array (FPGA), or similar device capable of executing instructions. The processor 16 may cooperate with memory to execute instructions. Memory may include a non-transitory machine-readable storage medium that may be any electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, a storage drive, an optical disc, and the like. The machine-readable storage medium may be encoded with executable instructions.

The processor 16 may execute instructions to convert the image of the scene captured by the camera device 14 into a panoramic image. When the camera device 14 captures video, that is, a series of images or frames, the instructions are to convert the video of the scene captured by the camera device 14 into a panoramic video.

Figure 2:
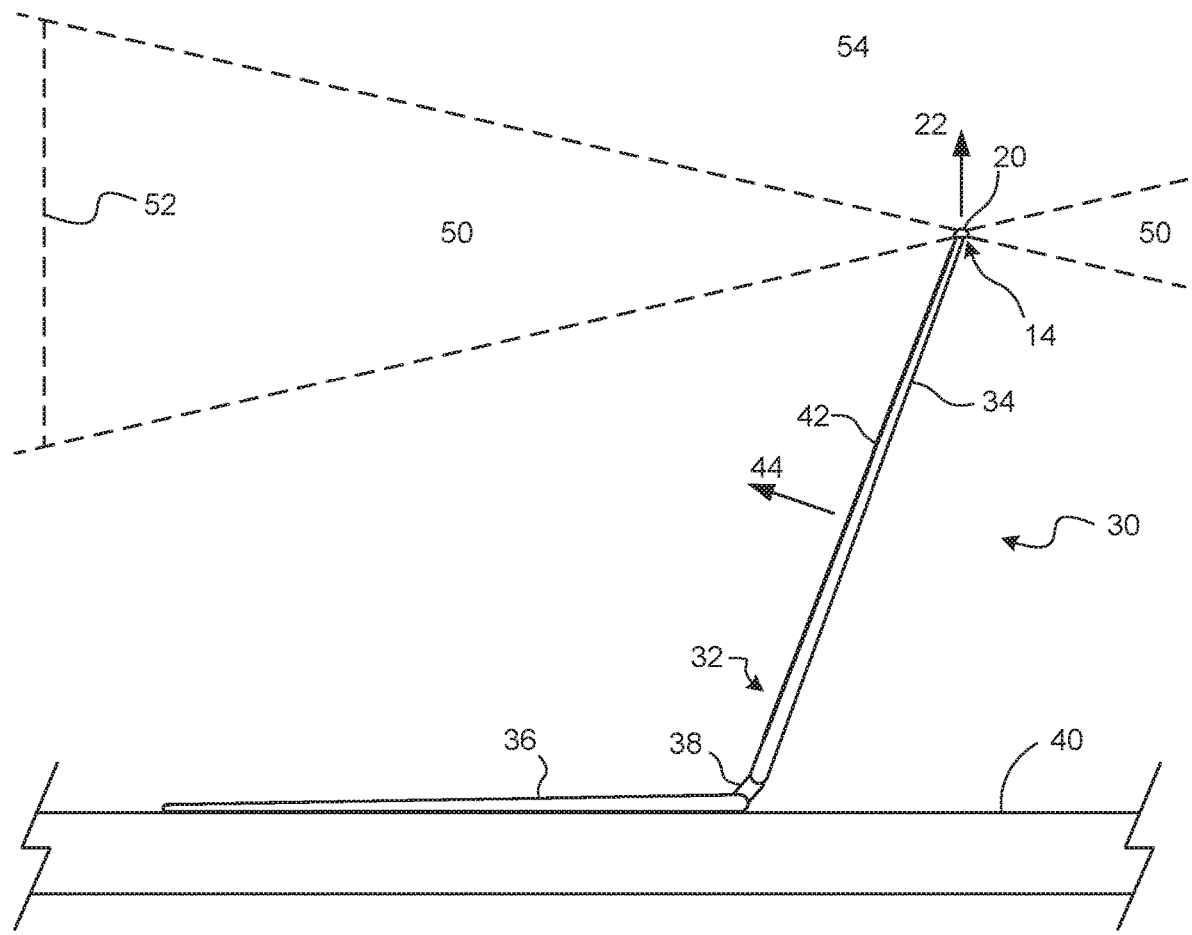
FIG. 2 is a side view of another example computer device.

FIG. 2 shows an example computer device 30. The computer device 30 includes a housing 32, a camera device 14, and a processor. The description of the other devices discussed herein may be referenced for further description of the computer device 30.

The housing 32 includes a first portion 34, a second portion 36, and a hinge 38 that pivotally connects the first portion 34 to the second portion 36. The first portion 34 may include a display device 42, such as a touchscreen display, and the second portion 36 may include a user input device, such as a keyboard, touchpad, and similar. The camera device 14 may be connected to an upper end of the first portion 34 of the housing 32.

In use, the housing 32 may be supported by a support surface 40, such as a table top, desk, or similar. In such a configuration, a lens 20 of the camera device 14 faces upwards 22 to capture a scene around the housing 32. The display device 42 may face outwards 44 to be viewable.

A lateral field of view 50 around the housing 32 may be used to capture a cylindrical image 52 of the scene, which may be converted into a panoramic image. A lateral field of view 50 may be captured by a outer region of an upward-pointing fisheye lens 20 and may span 360 degrees laterally around the housing 32. This may be useful for video conferences having participants situated around a table on which the computer device 30 is placed. An upwards field of view 54 above the lens 20, or in the direction in which a fisheye lens 20 is aimed, may be ignored or discarded, if it is not of interest. The upwards field of view 54 may be kept and processed with the lateral field of view 50.

Figure 3:
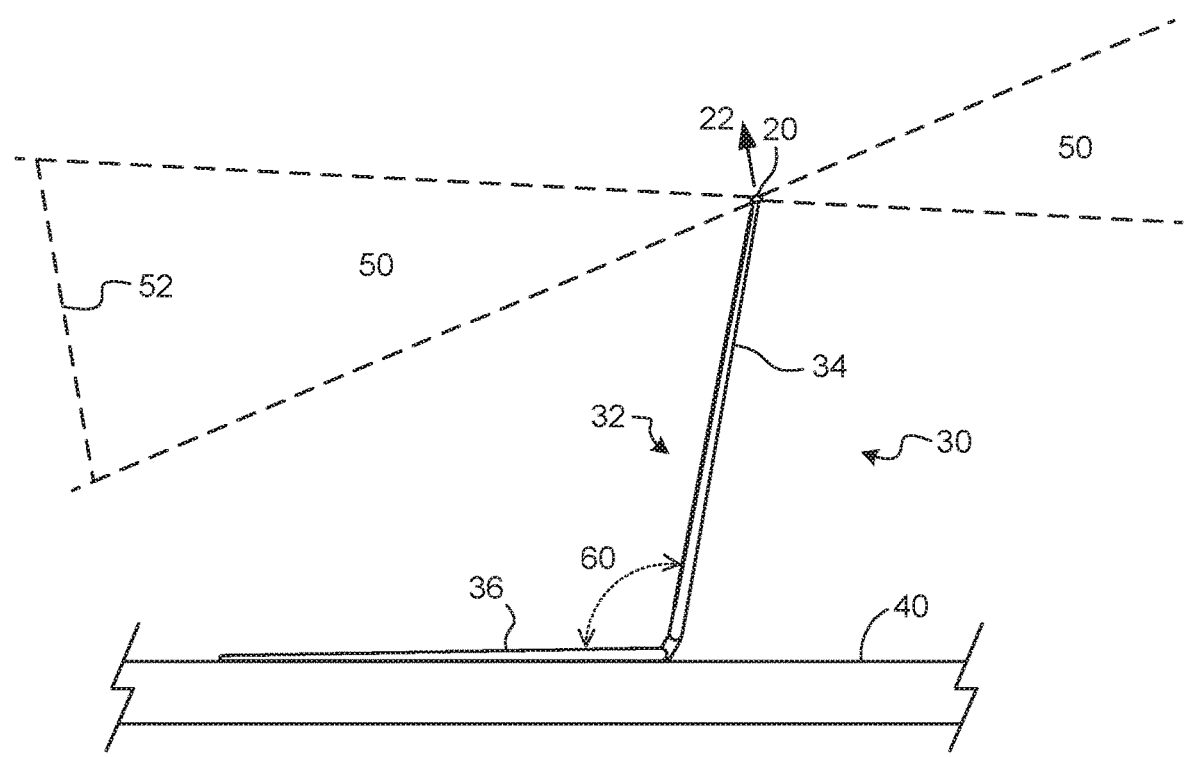
FIG. 3 is a side view of the example computer device of FIG. 2 opened to an included angle.
Figure 4:
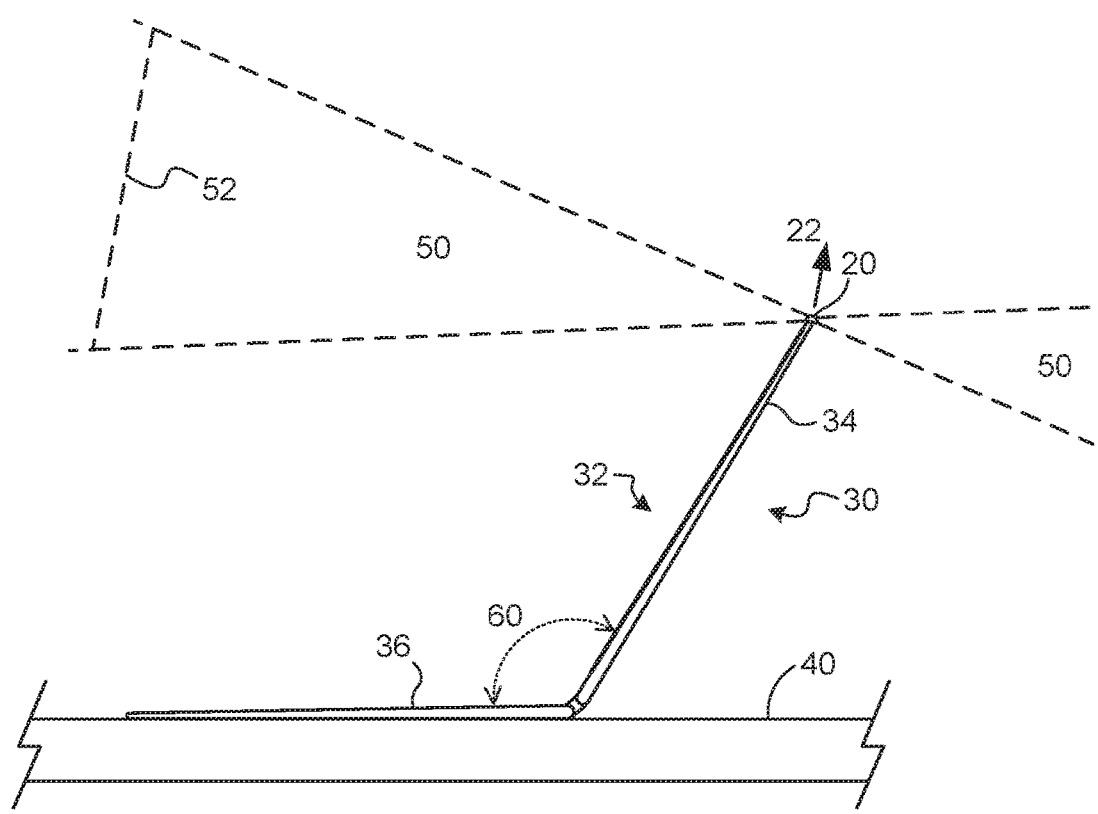
FIG. 4 is a side view of the example computer device of FIG. 2 opened to another included angle.

As shown in FIGS. 3 and 4, a fisheye lens 20 need not be pointed directly upwards to capture a suitable lateral field of view 50 of a scene around a computer device 30. An included angle 60 separating first and second portions 34, 36 of a housing 32 of the computer device 30 may range based on user preference and tolerance.

Figure 5:
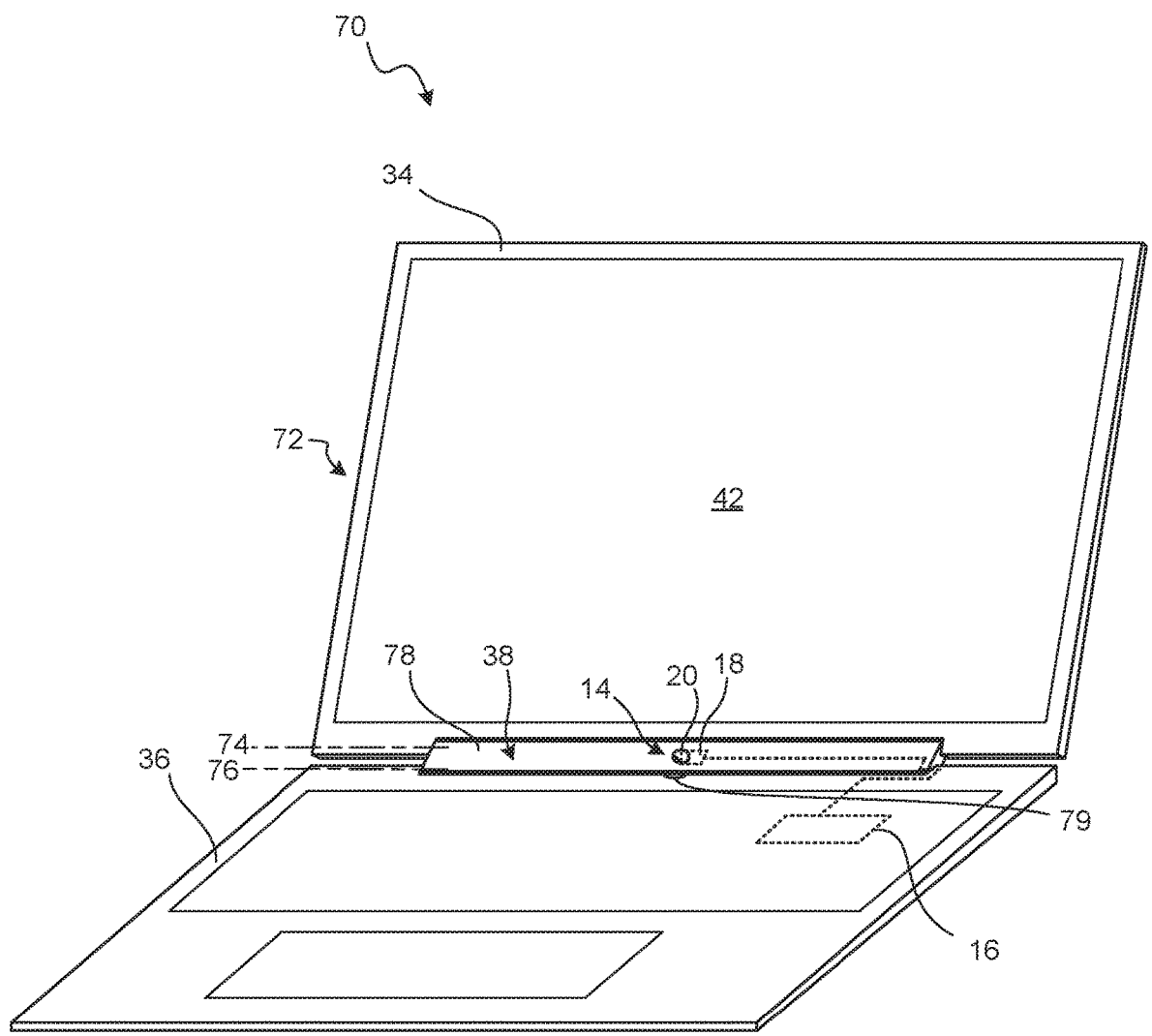
FIG. 5 is a perspective view of another example computer device.

FIG. 5 shows another example computer device 70. The computer device 70 includes a housing 72, a camera device 14, a display device 42, and a processor 16. The description of the other devices discussed herein may be referenced for further description of the computer device 70.

The housing 72 includes a first portion 34 and a second portion 36. The first portion 34 may contain the display device 42. The second portion 36 may include a user input device, such as a keyboard, touchpad, and similar.

A hinge 38 pivotally connects the second portion 36 to the first portion 34. The hinge 38 may include a hinge barrel 78 that may be pivot connected to both the first portion 34 and the second portion 36. The hinge barrel 78 may include an elongate body that defines one or more longitudinal axes 74, 76 about which the respective first portion 34 and second portion 36 pivot.

The camera device 14 includes an image sensor 18 and a lens 20, such as a fisheye lens, 360-degree lens, or similar. The camera device 14 may be disposed at the hinge barrel 78.

The first portion 34 and the second portion 36 of the housing 72 may be mutually orientable by the hinge 38 into a closed configuration, which may be a configuration, for example, where a display device 42 and keyboard are adjacent and face each other. Further, if the lens 20 is a fisheye lens or similar, the lens 20 may protrude from the hinge barrel 78. As such, one or both of the first portion 34 and the second portion 36 may include a recess 79 positioned to accommodate the protruding lens 20 in the closed configuration.

Figure 6:
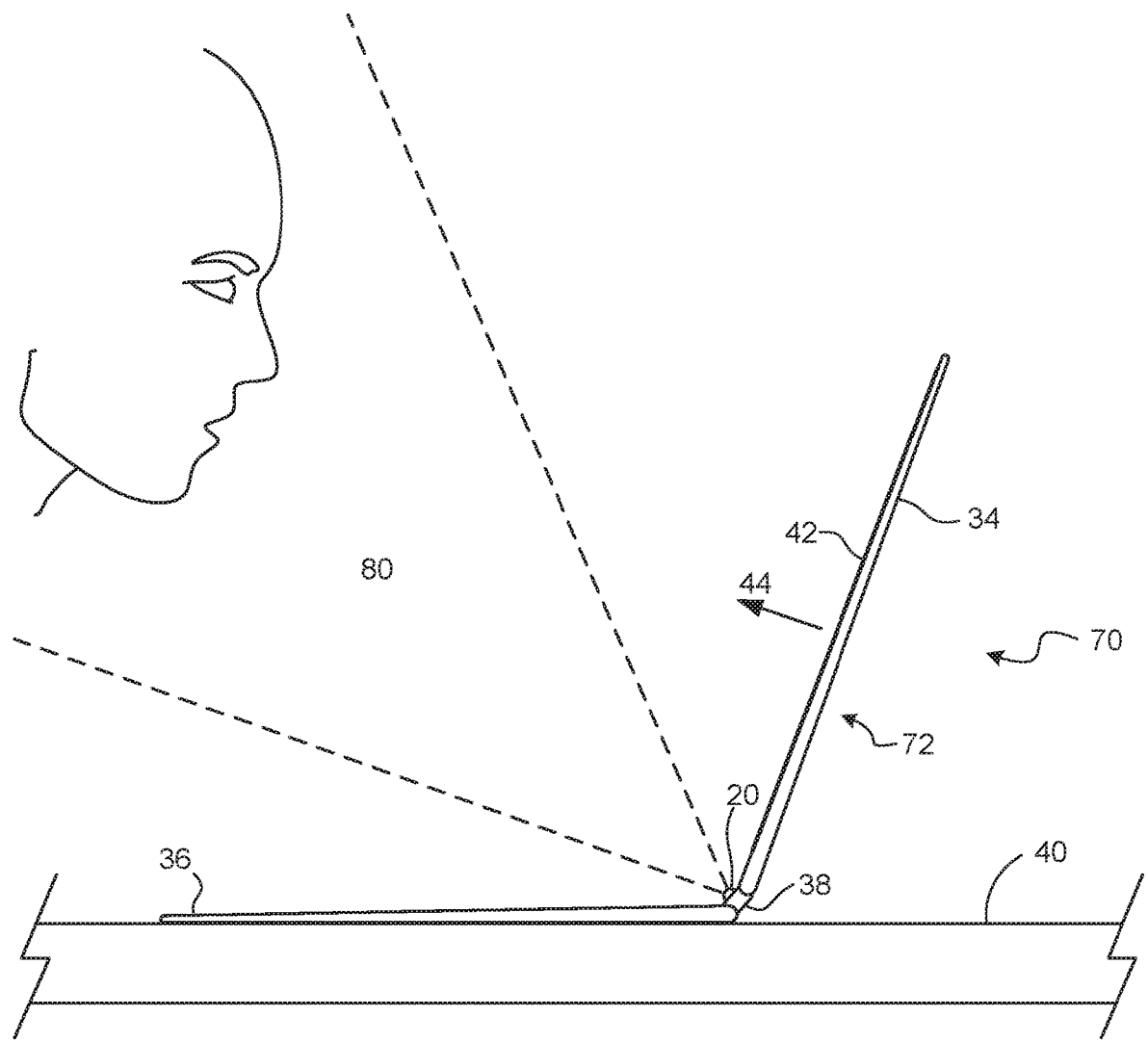
FIG. 6 is a side view of the example computer device of FIG. 5.

As shown in FIG. 6, in use, the housing 32 may be supported by a support surface 40, such as a table top, desk, or similar. In such a configuration, which may be termed a non-360-degree configuration, the lens 20 of the camera device 14 faces outwards 44 towards a user of the computer device 70 to define a central field of view 80 to capture an image of the user. At the same, display device 42 may face outwards 44 to be viewable by the user.

Figure 7:
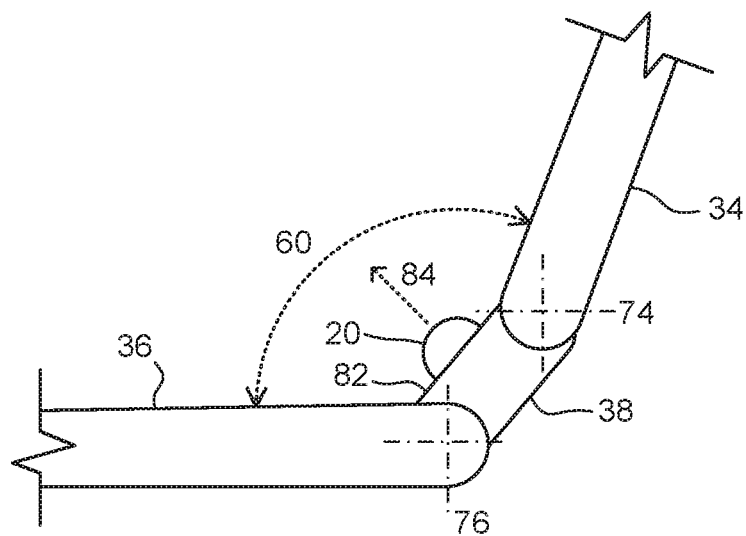
FIG. 7 is a side view of an example hinge in an example configuration.
Figure 8:
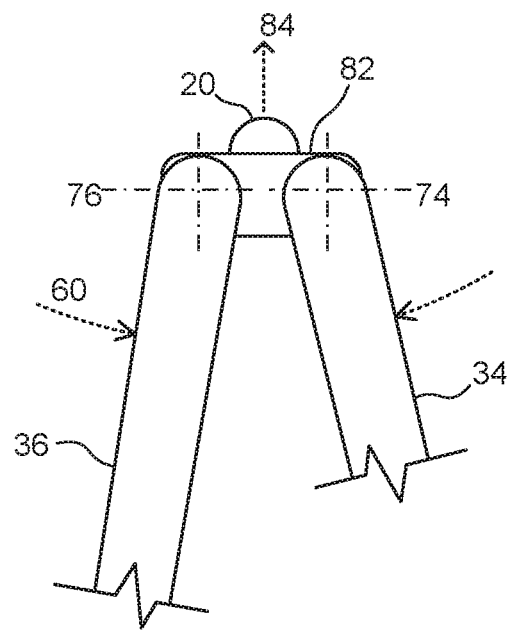
FIG. 8 is a side view of an example hinge in another example configuration.

With reference to FIGS. 7 and 8, a first portion 34 and a second portion 36 of a housing are mutually orientable by a hinge 38 to provide a range of configurations to a computer device. The hinge 38 may control an included angle 60 between the first portion 34 and the second portion 36 to range from an acute angle to a reflex angle (i.e., less than or equal to 360 degrees and greater than 180 degrees). The hinge 38 may have an elongate body (into the page) extending along one or more longitudinal pivot axes 74, 76. A fisheye lens 20, 360-degree lens, or similar may be disposed at the hinge 38 within the included angle 60 and may protrude from an exterior surface 82 of the elongate body of the hinge 38 in a direction 84 that has a vector component that is perpendicular to a longitudinal axis 74, 76. That is, the direction 84 that the lens 20 points may have a component that is perpendicular to one or both of the longitudinal axes 74, 76 for a range of included angles 60 provided by the longitudinal axes 74, 76.

In one example configuration, shown in FIG. 7, an included angle 60 is an obtuse angle. In another example configuration, shown in FIG. 8, the included angle 60 is a reflex angle and the lens 20 is exposed to a scene around the computer device.

Figure 9:
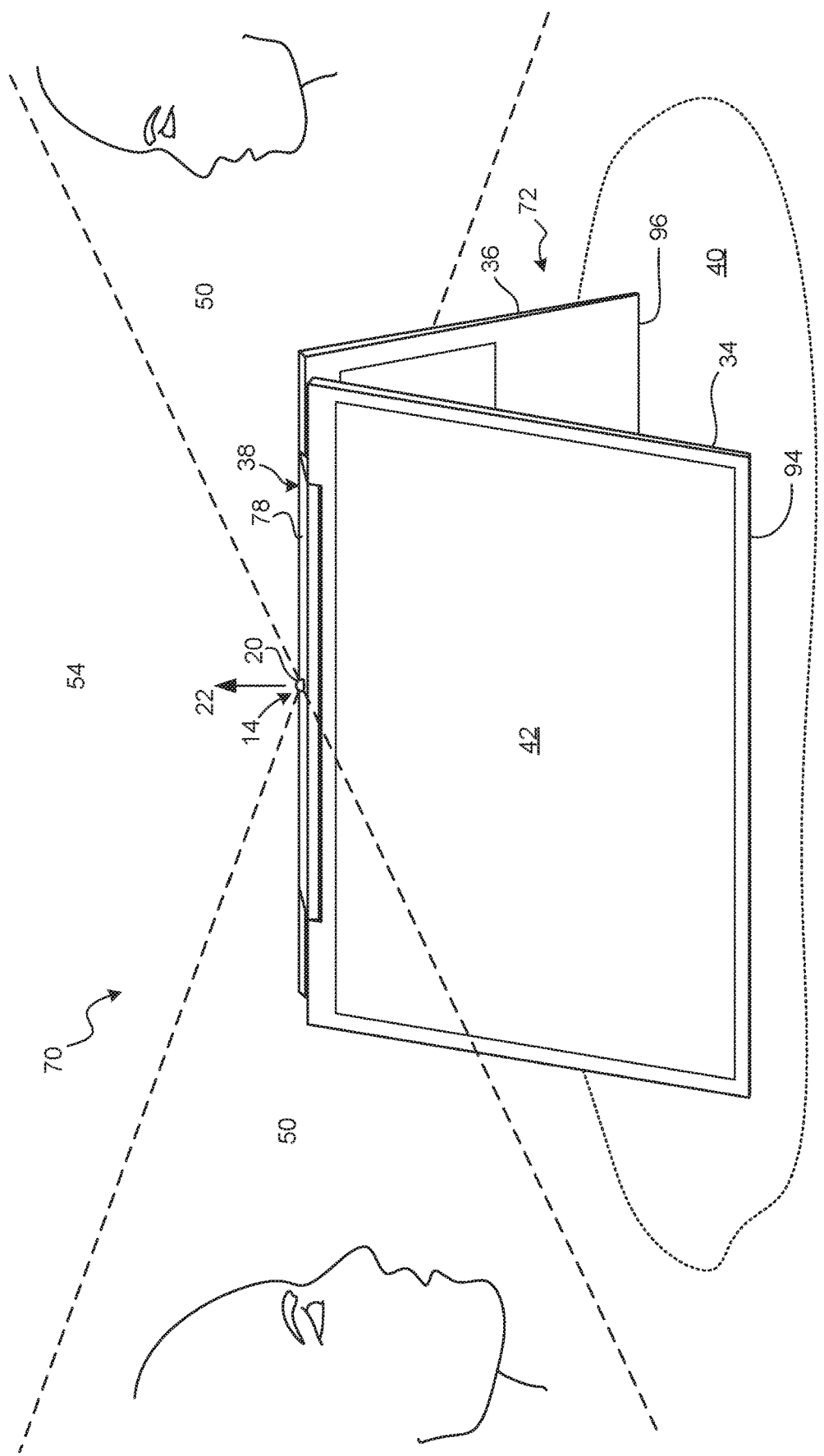
FIG. 9 is a perspective view of the example computer device of FIG. 5 in an example video conference configuration.

FIG. 9 shows a computer device 70 in an example configuration. This configuration may be useful for 360-degree video conferencing, as contrasted with the configuration shown in FIG. 6.

A hinge 38 pivotally connects a first portion 34 and a second portion 36 of a housing 72. A camera device 14 includes a fisheye lens 20, 360-degree lens, or similar kind of lens, that is disposed at the hinge 38. The lens 20 may be integrated into and protrude from a hinge barrel 78 of the hinge 38. In this example configuration, an included angle between the housing portions 34, 36 is a reflex angle and an end 94 of the first portion 34 and an end 96 of the second portion 36 are positionable to be supported by a support surface 40, such as a conference room table. As such, the fisheye lens 20 points upwards 22 to capture an image of a scene around the housing 12. The lens 20 provides a lateral field of view 50 around the housing 72. An upwards field of view 54 above the lens 20, or in the direction in which a fisheye lens 20 is aimed, may be ignored or discarded. Images of any number of users in the lateral field of view 50 may be captured and provided to a video conferencing system, so that remote users may see users present around the computer device 70. At the same time, users present around the computer device 70 may view a display device 42 of the computer device 70, as the display device 42 may face outwards when the first portion 34 and the second portion 36 of the housing 72 are mutually oriented into this configuration. Images of remote users, documents, or other useful information may be presented on the display device 42 during a video conference.

The size of the first portion 34, the size of the second portion 36, the included angle between the first portion 34 and the second portion 36, or any combination of such may be selected to position the lens 20 at a height above the support surface 40 that is conducive to a video conference. An example of such a height is eye level.

The lateral field of view 50 may span 360 degrees. If the lens 20 is selected to be a fisheye lens, a outer region of the lens contains image information associated with a 360-degree lateral field of view, while a central region of the lens may contain information that is less useful and that may be excluded to as to reduce image processing requirements.

Figure 10:
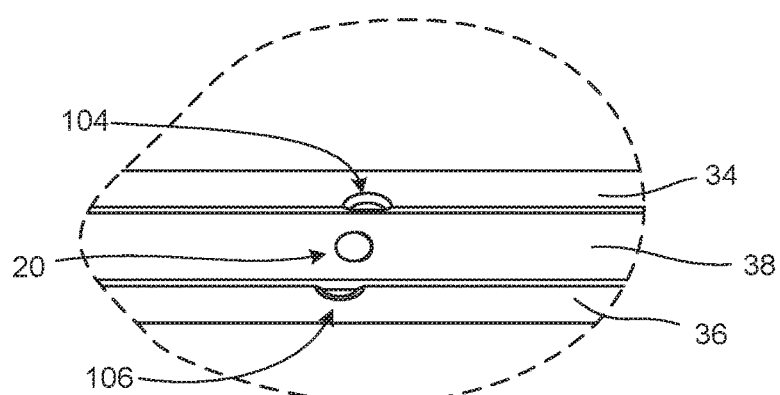
FIG. 10 is a perspective view of a portion of an example computer device having an example recess to accommodate an example camera lens.

FIG. 10 shows a close up of a region around a lens, such as a protruding fisheye lens 20. A first portion 34 and a second portion 36 of a computer device housing may be mutually orientable by a hinge 38 into a closed configuration. One or both of a first portion 34 and a second portion 36 may include a recess to accommodate the lens 20 in the closed configuration. In this example, both the first portion 34 and the second portion 36 include a respective recess 104, 106.

Figure 11:
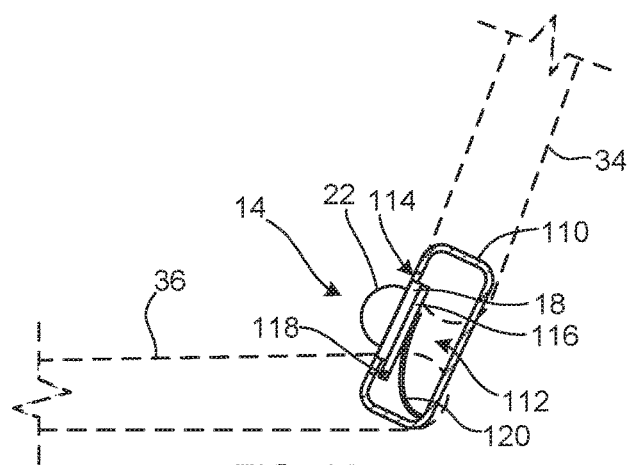
FIG. 11 is a partial cross-sectional side view of a portion of an example computer device having an example bias mechanism to bias an example camera lens.
Figure 12:
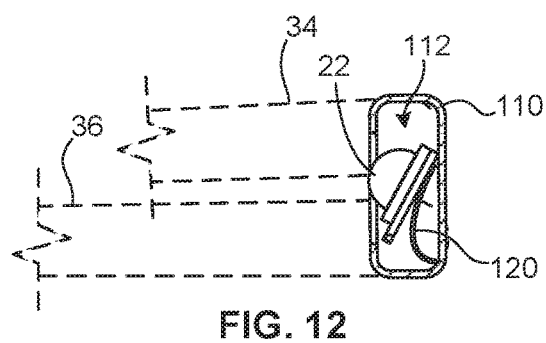
FIG. 12 is a partial cross-sectional side view of the example bias mechanism of FIG. 11 in another position.

As shown in FIGS. 11 and 12, a camera device 14 may be provided to a hinge barrel 110 of a hinge that pivot connects a first portion 34 and a second portion 36 of a computer device housing. An image sensor 18 of the camera device may be positioned inside a cavity 112 in the hinge barrel 110. A lens 20 of the camera device 14 may be extendible from the cavity 112 through an opening 114 in the hinge barrel 110. A carrier 116 may be provided to the camera device 14 to physically hold the image sensor 18 and lens 20. The carrier 116 may be pivot connected to the hinge barrel 110 at a pivot point 118, so that the lens 20 may be moveable between an extended position, in which the lens 20 protrudes from the hinge barrel 110, and a recessed position, in which the lens 20 is contained within the hinge barrel 110. A bias mechanism 120, such as spring, may be provided to bias the carrier 116 into a position that allows the lens 20 to protrude from the hinge barrel 110 to capture images in a vicinity around the outside of the hinge barrel 110. FIG. 11 shows the lens 20 biased into a position extended from the hinge barrel 110. FIG. 12 shows the lens 20 pushed into the cavity 112 in the hinge barrel 110 against a force of the bias mechanism 120. The lens 20 may be pushed into the cavity 112 by contact with one or both portions 34, 36 of the housing.

Figure 13:
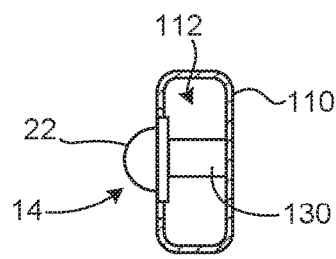
FIG. 13 is a partial cross-sectional side view of an example hinge having another example bias mechanism to bias an example camera lens.
Figure 14:
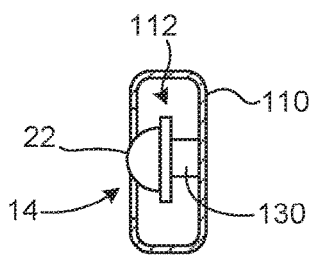
FIG. 14 is a partial cross-sectional side view of the example bias mechanism of FIG. 13 in another position.

As shown in FIGS. 13 and 14, a camera device 14 may be provided to a hinge barrel 110 of a hinge that pivot connects portions of a computer device housing. A push-push mechanism 130 may be positioned inside a cavity 112 within the hinge barrel 110 to hold the camera device 14 with respect to the hinge barrel 110. The push-push mechanism 130 may include a push-activated bias mechanism toggles between positioning the lens 20 in an extended position, as shown in FIG. 13 and a recessed position within the cavity 112, as shown in FIG. 14.

Figure 15:
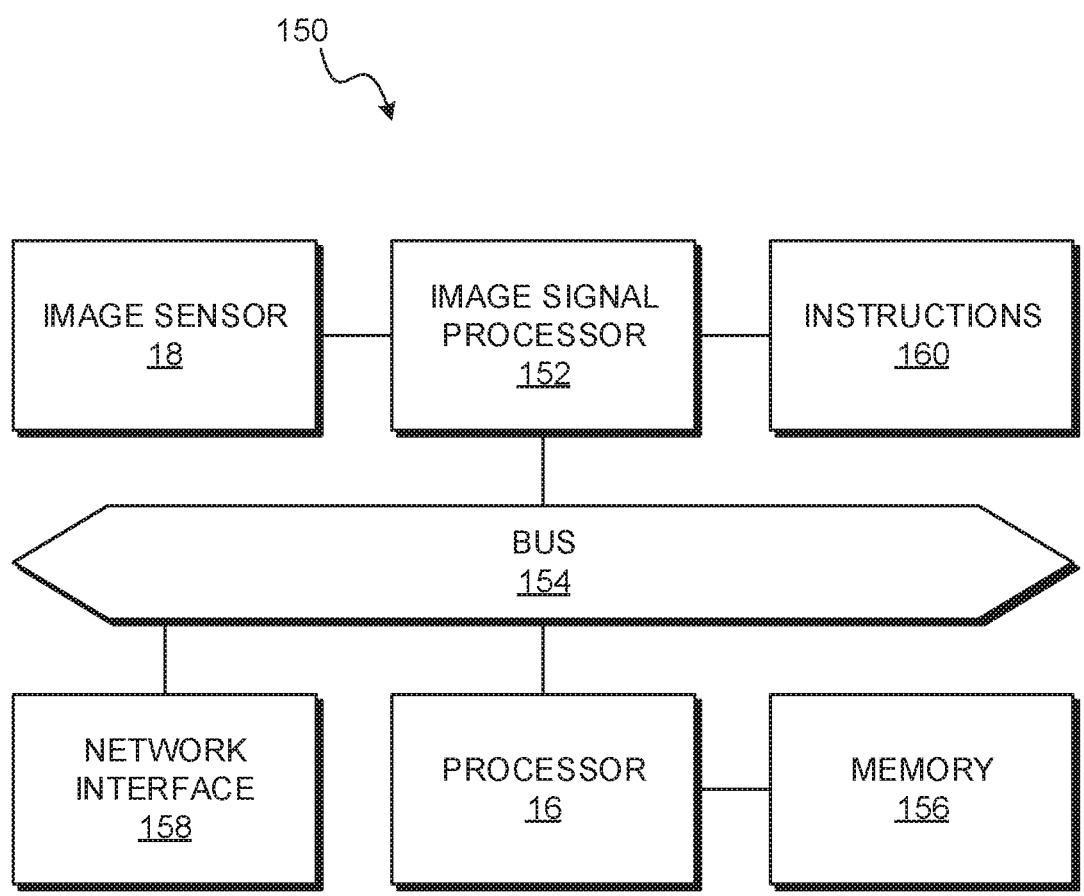
FIG. 15 is a block diagram of an example image processing system.

An example image processing system 150 is shown in FIG. 15. The image processing system 150 may be used with any of the computer devices and camera devices discussed herein. The image processing system 150 is to process images captured by a camera device for presentation at a display device.

The system 150 may include an image sensor 18, an image signal processor 152, a bus 154, a processor 16, memory 156, and a network interface 158. The image sensor 18 may be coupled to a lens, such as a fisheye lens, a 360-degree lens, or similar. The network interface 158 may include an Ethernet interface, a wireless interface, or similar for data communications with a computer network. The bus 154 may provide data connections among components of the system 150 and may include a Universal Serial Bus (USB), Mobile Industry Processor Interface (MIR), or similar. Examples of devices usable for the processor 16 and memory 156 are discussed elsewhere herein.

The image signal processor 152 may include a microcontroller, a microprocessor, a processing core, an FPGA, or similar device capable of cooperating with memory to execute instructions. The image signal processor 152 may be dedicated to the image sensor 18 and may be provided on the same chip as the image sensor 18. In other examples, the image signal processor 152 and the processor 16 are the same device.

The processor 16 and memory 156 may store and execute instructions that provide an endpoint of a video conferencing system. As such, the image signal processor 152 may provide images to the bus 154 for further processing, storage, and transmission via the network interface 158.

Instructions 160 may be provided to perform any suitable image processing operation on captured images. The instructions 160 may be executable by the image signal processor 152 and may be stored in memory 156 or in separate memory, which may be dedicated to the image signal processor 152.

The instructions 160 may include instructions to convert an image captured of a scene into a panoramic image. A panoramic image may omit an upwards field of view, such as that shown in FIG. 9. The instructions 160 may include instructions to de-warp a captured image.

The instructions 160 may include instructions to select a field of view and select image processing to be performed depending on the configuration of a computer device provided with the image processing system 150. For example, instructions may detect that the computer device is in a non-360-degree configuration, such as that shown in FIG. 6, and accordingly select a central field of view and suitable processing to de-warp the central field of view. Likewise, the instructions may detect that the computer device is in a 360-degree configuration, such as that shown in FIG. 9, and accordingly select a outer field of view and select suitable processing to convert captured images into panoramic images and de-warp such images.

Figure 16:
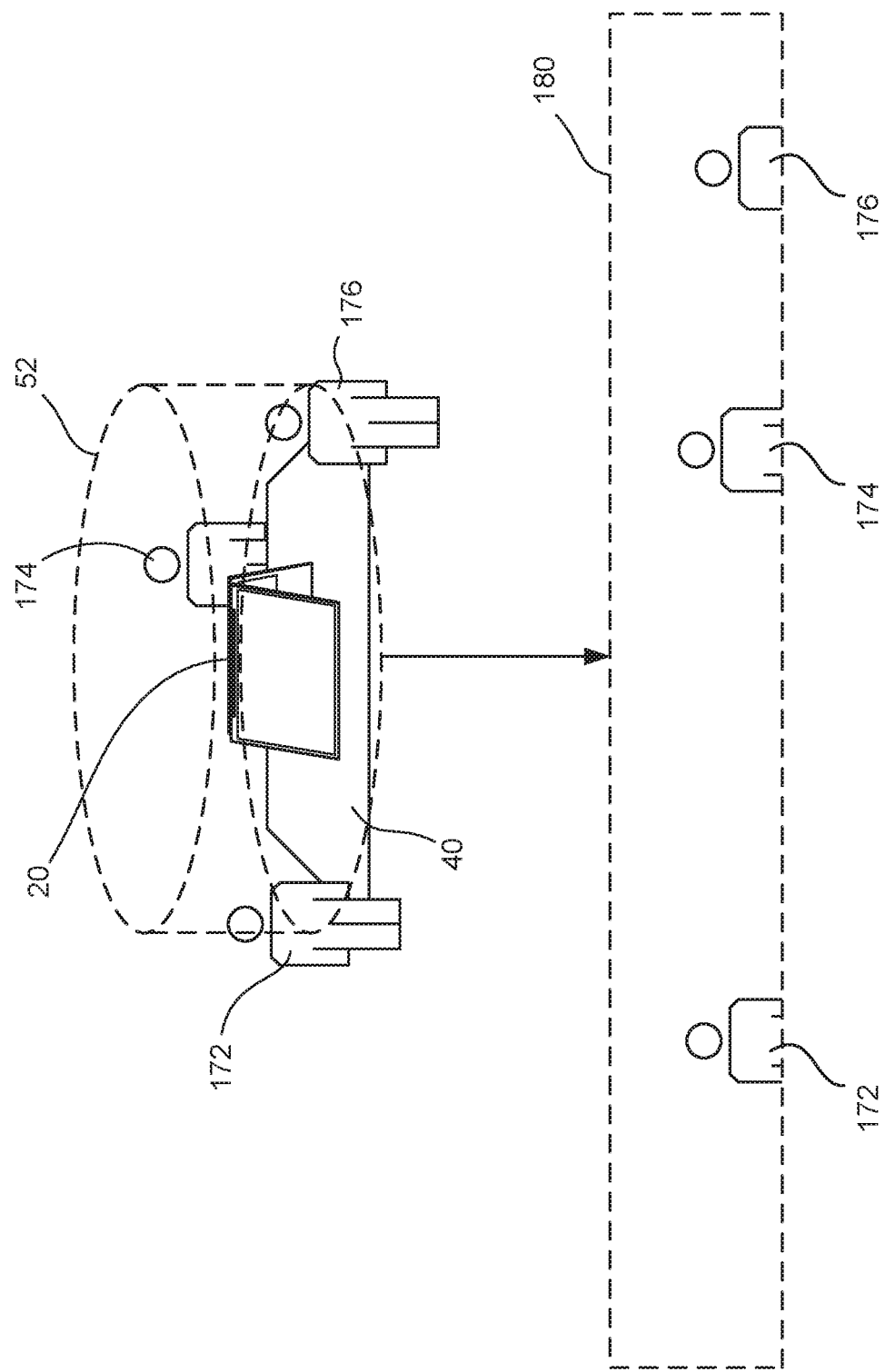
FIG. 16 is a schematic diagram of an example image processing operation.

FIG. 16 shows a computer device, such as that of FIG. 9, positioned on a support surface 40, such as a table. The computer device is configured and positioned on the support surface 40, so that a lens 20 of a camera device provided to the computer device is aimed in a direction that defines a 360-degree field of view to capture a cylindrical image 52 of the scene around the computer device, including subjects 170, 172, 174, such as individuals participating in a video conference. A captured image may be processed into a panoramic image 180 and de-warping may be performed so that the scene and its subjects 170, 172, 174 may appear true to life or nearly so.

Figure 17:
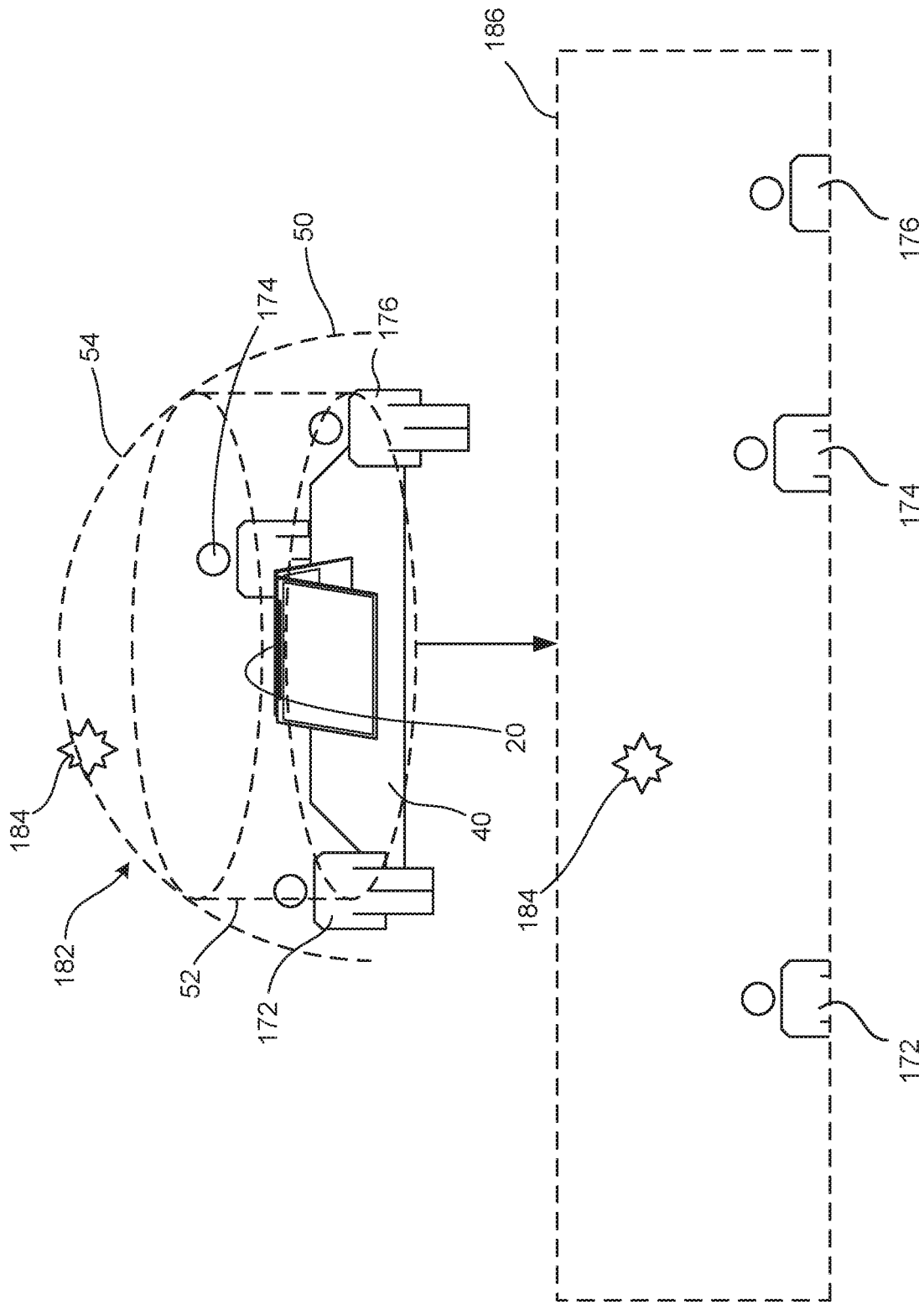
FIG. 17 is a schematic diagram of another example image processing operation.

FIG. 17 illustrates that a lens 20 of a camera device provided to a computer device, such as that of FIG. 9, may have a dome-shaped or hemispherical field of view 182. A 360-degree cylindrical image 52 of the scene around the computer device may be a result of processing a lateral field of view 50 taken from the total field of view 182. Another portion of the total field of view, that is, an upwards field of view 54 above the computer device, may be kept and processed in a similar manner. A captured image may be processed into a panoramic image 186 and de-warping may be performed so that subjects 170, 172, 174 present in the lateral field of view 50 and subjects 184 present in the upwards field of view 54 are visible in the same image.

Figure 18:
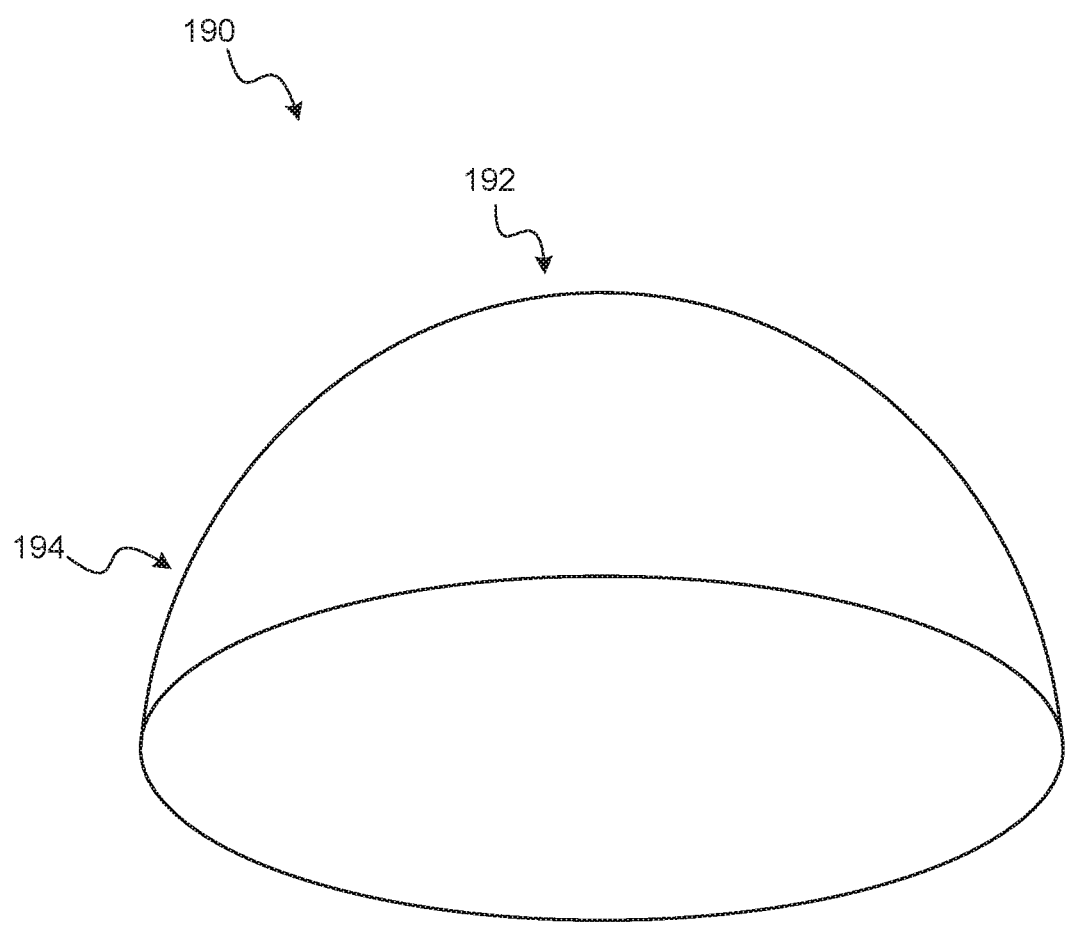
FIG. 18 is a perspective view of an example hemispherical fisheye lens.

FIG. 18 shows an example hemispherical fisheye lens 190 that may be used with any of the camera devices discussed herein. The lens 90 includes a central region 192 and an outer or peripheral region 194. Image information captured by the central region 192 may be discarded or ignored when capturing images in a 360-degree configuration and may be processed when capturing images in a non-360-degree configuration. Image information captured by the outer region 194 may be processed when capturing images in a 360-degree configuration.

It should be apparent from the above that a computer device, such as a notebook computer, may be provided with a camera device able to capture a large field of view while providing a compact physical form. The computer device may be used for video conferencing with multiple users situated around the computer device, and the camera device may be readily positionable at a suitable height. The processing requirements to stitch multiple images together are reduced or eliminated. Further, an exposed camera lens may be protected by the housing of the computer device when not in use.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A computer device comprising:
a housing;
a hinge to pivotally connect a first portion of the housing to a second portion of the housing;
a camera device at the housing, the camera device including an image sensor and a fisheye lens, the fisheye lens positioned at the hinge and moveable relative to the hinge, in a direction perpendicular to a longitudinal axis of the hinge, between a position recessed in the hinge and a position extended from the hinge, the fisheye lens to point upwards in the position extended from the hinge to capture an image of a scene around the housing; and
a processor disposed in the housing and coupled to the camera device, the processor to execute instructions, the instructions to convert the image of the scene into a panoramic image.

2. The computer device of claim 1, wherein the hinge includes a hinge barrel and the fisheye lens is disposed at the hinge barrel.

3. The computer device of claim 1, wherein the first portion and the second portion of the housing are mutually orientable by the hinge into a configuration in which the first portion and the second portion are separated by an included angle, the hinge to control the included angle to range from an acute angle to a reflex angle, wherein the fisheye lens is disposed within the included angle.

4. The computer device of claim 3, wherein when the configuration sets the included angle to be the reflex angle, an end of the first portion and an end of the second portion of the housing are positionable to be supported by a support surface to point the fisheye lens upwards.

5. The computer device of claim 1, wherein the instructions are further to de-warp the image.

6. The computer device of claim 1, wherein the fisheye lens is to be pushed into the position recessed in the hinge by contact with one or both of the first portion and the second portion of the housing.

7. A computer device comprising:
a housing including a first portion and a second portion, wherein the first portion of the housing contains a display device;
a hinge that pivotally connects the second portion to the first portion;
a camera device including an image sensor and a lens, the camera device positioned at the hinge and moveable relative to the hinge, in a direction perpendicular to a longitudinal axis of the hinge, between a position recessed in the hinge and a position extended from the hinge;
the first portion and the second portion of the housing mutually orientable by the hinge into a configuration in which an end of the first portion and an end of the second portion are positionable to be supported by a support surface and in which the lens of the camera device faces upwards to capture an image of a scene around the housing.

8. The computer device of claim 7, wherein the camera device further comprising a bias mechanism to bias the lens at the position extended from the hinge.

9. The computer device of claim 7, wherein the display device faces outwards when the first portion and the second portion of the housing are mutually oriented into the configuration.

10. The computer device of claim 7, wherein the lens has a 360-degree field of view.

11. A hinge comprising:
a barrel including an elongate body, the body to connect a first portion of a computer device to a second portion of the computer device to pivot about a longitudinal axis of the elongate body; and
a camera lens connected to the elongate body and moveable relative to the elongate body, in a direction perpendicular to the longitudinal axis of the elongate body, between a position recessed in the elongate body and a position extended from the elongate body, wherein in the position extended from the elongate body, the camera lens is to protrude from the elongate body in a direction that has a vector component that is perpendicular to the longitudinal axis.

12. The hinge of claim 11, wherein the camera lens has a 360-degree field of view.

* * * * *